Dec. 21, 1965     J. H. STEINWAY     3,224,788
LOCKING ARRANGEMENT FOR SEMITRAILER COUPLING
Filed Jan. 7, 1964
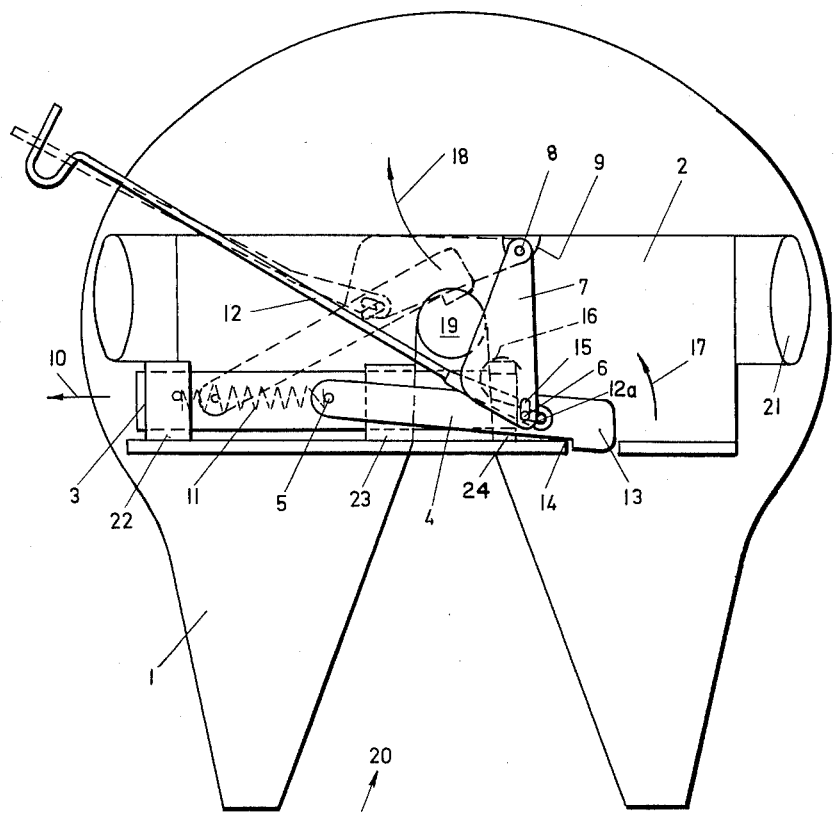
INVENTOR.
Josef H. Steinway
BY
Kurt Kelman
agent

United States Patent Office 3,224,788
Patented Dec. 21, 1965

3,224,788
LOCKING ARRANGEMENT FOR SEMITRAILER
COUPLING
Josef H. Steinway, Ibis Island 2235,
Palm Beach, Fla.
Filed Jan. 7, 1964, Ser. No. 336,306
Claims priority, application Germany, Jan. 12, 1963,
St 20,170
6 Claims. (Cl. 280—434)

The present invention relates to a detachable connection between two coupling parts, and more particularly to a new and improved locking arrangement for such a coupling. It is of particular advantage in semitrailer couplings and will, therefore, be described with reference thereto.

Semitrailer couplings conventionally consist of a fifth wheel plate mounted on a tractor and a kingpin mounted on the underside of the front end of a trailer. The fifth wheel plate has a guideway or slot extending in the general direction of travel of the semitrailer and the kingpin is detachably received in this guideway. For coupling the trailer to the tractor, the kingpin must be locked in the guideway and a suitable locking arrangement includes a spring-biased locking bolt which may be moved transversely across the guideway between a locking position and an open position. Usually, a spring-biased safety catch is provided for maintaining the locked bolt in the closed position.

In conventional couplings of this general type, uncoupling of the trailer from the tractor requires first removal of the safety catch and then movement of the locking bolt against the steadily increasing force of the spring which presses it into the locking position. Finally, an additional catch means is required to hold the bolt in the open position when the bolt spring bias is strongest. In other words, actuation of the locking bolt involves not only several operations but also considerable force so that several operators and/or special tools may be needed to open the bolt. Furthermore, the enumerated conditions make it impossible to provide remote control for the bolt movement. Rather, the actuating mechanism must be readily accessible and it is, therefore, not possible to hide the coupling in a casing.

It is the primary object of the present invention to overcome these and other disadvantages and to provide a locking arrangement for a coupling, wherein the force required for opening a spring-biased locking bolt is much more favorably distributed than in conventional actuating mechanisms and wherein the bolt actuating mechanism automatically provides safety devices for holding the bolt in its locking and open positions.

It is a concomitant object of the invention to provide a single actuating member for the operation of the bolt and for securing it in its respective end positions.

It is another object of the invention to provide an actuation for the locking bolt, which may readily be linked to a control system operable from a remote point, for instance the control panel of the tractor, so that the entire coupling may be mounted in a casing hiding the coupling components from view.

These and other objects are accomplished in accordance with the present invention by providing a toggle joint having two levers and a rigid actuating member connected to the toggle joint to move the locking bolt against the force of its biasing means into an open position. The toggle joint has two levers, one end of each lever being respectively linked to the locking bolt and to one coupling part, i.e. the fifth wheel plate, and the toggle joint levers being linked at a pivot intermediate the one lever ends. The actuating member is preferably connected to the toggle joint pivot.

The safety catch for holding the bolt in the locking position comprises according to the invention a catch on one of the toggle joint levers and a stop on the one coupling part. The catch and the stop are arranged for engagement when the locking bolt is in the locking position and thus secure the bolt in this position.

According to one feature of the invention, the toggle joint pivot is movable in an elongated slot in one of the toggle joint levers. According to another feature, a further biasing means is arranged normally to hold the one toggle joint lever with the catch in a position wherein the catch engages the stop.

The above and other objects, features and advantages of the present invention will become more apparent in the following detailed description of one embodiment thereof, taken in conjunction with the single figure of the accompanying drawing showing a bottom plan view of a fifth wheel plate carrying the locking arrangement of this invention.

Semitrailer couplings constituting a detachable connection between two coupling parts, i.e. a fifth wheel plate mounted on a tractor and a kingpin mounted on the underside of the front end of a trailer, are very well known and require no further description. Conventionally, the fifth wheel plate has a guideway extending in the general direction of travel of the semitrailer and adapted to receive the kingpin. For coupling the trailer to the tractor, the kingpin must, of course, be locked in the guideway of the fifth wheel plate. A suitable locking arrangement includes a spring-biased locking bolt which may be moved between a locking and an open position.

Since semitrailer couplings of this type are well known and the present invention is concerned only with a new and improved locking arrangement actuation, only such parts of the coupling have been illustrated as will suffice to show the convention of the invention therewith.

In the drawing, the one illustrated coupling part is fifth wheel plate 1 having guideway 20 adapted to receive the other coupling part schematically shown as kingpin 19. The drawing shows the underside of the fifth wheel plate which is rockably mounted on a tractor platform by means of transverse fifth wheel axle 21 in any suitable manner and since this mounting is conventional and forms no part of the present invention, it has not been illustrated. The axle is fixedly attached to the fifth wheel plate and carries a support plate 2 for the locking arrangement.

Aligned bearing blocks 22 and 23 are mounted on the support plate 2 and hold a locking bolt 3 for sliding movement transversely across the guideway 20 between a locking position and an open position. In the drawing, the kingpin 19 is shown inserted in the guideway and locked therein by the bolt which extends across the guideway in the locking position. Biasing means constituted by spring 11 in the illustrated embodiment acts upon locking bolt 3 and normally holds it in the locking position, the force of spring 11 being directed against the guideway.

The new and improved actuating mechanism for moving the bolt from the normally closed to the open position, wherein the bolt is removed from the path of the guideway and thus permits the kingpin 19 to be removed therefrom, includes a toggle joint and a rigid actuating member for operating the toggle joint. As shown, the toggle joint has two levers, one end of one of the levers 4 being pivotally linked at 5 to locking bolt 3 and one end of the other lever 7 being pivotally linked at 8 to a fixed lug 9 mounted on support plate 2 of fifth wheel plate 1. The ends of the toggle joint levers 4, 7 respectively remote from the pivots 5, and 8 are linked together at pivot 6.

When it is desired to move the locking bolt 3 from the illustrated locking position into the open position, it must be moved in the direction of arrow 10 against the bias of spring 11. This movement is effected by pulling the rod 12 which constitutes a rigid actuating member. This rod is connected to the pivot 6 of the toggle joint and, when pulled, it will move the toggle joint levers 4, 7 into the position indicated in broken lines, thus forcing the locking bolt to move in the direction of arrow 10.

In the preferred embodiment illustrated herein, the one toggle joint lever 4 has a safety catch 13 at the end opposite to the lever end linked to bolt 3. This catch is arranged to engage stop 14 when the bolt is in the locking position and thus to secure the bolt in the latter position. The catch is held in engagement with the stop by a biasing means shown as leaf spring 16 attached to the underside of lever 7 and bearing against the pivot 6, and the pull rod 12 is arranged to move against the force of the latter biasing means, as well as that of the spring 11, to move the bolt into the open position. The pivot 6 of the toggle joint is movably mounted in elongated slot 12a of pull rod 12 and in elongated slot 15 of toggle joint lever 7 to make it possible to lift catch 13 of lever 4 off its engagement with stop 14 when the pull rod is pulled.

The locking bolt is moved from its locking to an open position in the following manner, as will be obvious from the above description:

Pulling actuating member 12 away from the guideway 20, whether manually or by remote control connecting the member 12 to a suitable linkage system, will first move the pivot 6, which is mounted on lever 4, upwardly in elongated slot 15 of lever 7, as viewed on the drawing, so as to disengage safety catch 13 from fixed stop 15. After this initial movement, further pulling of rod 12 will cause lever 4 to swing in the direction of arrow 17 while lever 7 will simultaneously swing in the direction of arrow 18. This swing movement of the toggle joint levers forces locking bolt 3 into the open position in the direction of arrow 10 and against the increasing force of biasing spring 11. When levers 4 and 7 have reached the dead point of the toggle joint, the pulling force of rod 12 is zero. When the levers are moved beyond the dead point into the position shown in broken lines, the lever forces will secure the bolt in the open position.

While a preferred embodiment has been described and illustrated, it will be understood that many modifications and variations may readily occur to those skilled in the art, particularly after benefiting from the present teaching, without departing from the spirit and scope of the present invention as defined in the appended claims.

I claim:

1. A locking arrangement for a semitrailer coupling constituting a detachable connection between two coupling parts, one of said coupling parts being a fifth wheel plate having a guideway adapted to receive the other coupling part, a locking bolt mounted on the fifth wheel plate for sliding movement transversely across the guideway between a locking and an open position, biasing means acting upon said locking bolt and normally holding it in the locking position, a toggle joint having two levers and a pivot, each lever having two ends, one end of each lever being respectively linked to the locking bolt and to the fifth wheel plate and the toggle joint levers being linked by said pivot connecting the respective other ends thereof, a rigid actuating member connected to said toggle joint to move the locking bolt against the force of said biasing means into the open position, and a catch on one of the toggle joint levers, said catch being arranged to engage a stop on the fifth wheel plate when said locking bolt is in the locking position and thus to secure the bolt in said latter position.

2. The locking arrangement of claim 1, wherein the rigid actuating member is connected to the pivot of the toggle joint.

3. The locking arrangement of claim 1, further comprising a biasing means arranged normally to hold said one toggle joint lever in a position wherein the catch engages the stop, the rigid actuating member being arranged to move against the force of the latter biasing means to move the locking bolt into the open position.

4. The locking arrangement of claim 1, wherein the pivot of the toggle joint is movable in an elongated slot in one of the toggle joint levers.

5. A locking arrangement for a coupling constituting a detachable connection between two coupling parts, one of said coupling parts having a guideway adapted to receive the other coupling part, a locking bolt mounted on the one coupling part for sliding movement transversely across the guideway between a locking and an open position, biasing means acting upon said locking bolt and normally holding it in the locking position, a toggle joint having two levers and a pivot, each lever having two ends, one end of each lever being respectively linked to the locking bolt and to the one coupling part and the other ends of the toggle joint levers being linked by said pivot, a rigid actuating member connected to the toggle joint pivot to move the locking bolt against the force of said biasing means into the open position, a catch on one of the toggle joint levers, and a stop on the one coupling part, the catch and stop being arranged for engagement when said locking bolt is in the locking position and thus to secure the bolt in said latter position.

6. The locking arrangement of claim 5, wherein the pivot of the toggle joint is movable in an elongated slot in one of the toggle joint levers.

References Cited by the Examiner
UNITED STATES PATENTS

| 967,713 | 8/1910 | Blom | 280—508 |
| 2,676,817 | 4/1954 | White | 280—438 |
| 3,034,805 | 5/1962 | Becker | 280—434 |
| 3,063,738 | 11/1962 | Becker | 280—434 |

LEO FRIAGLIA, *Primary Examiner.*